(12) United States Patent
Tilt et al.

(10) Patent No.: US 6,360,235 B1
(45) Date of Patent: Mar. 19, 2002

(54) OBJECTIVE MEASUREMENT AND GRAPH THEORY MODELING OF WEB SITES

(75) Inventors: Christopher E. Tilt; Alistair C. Williamson, both of Portland, OR (US)

(73) Assignee: WebCriteria, Inc., Portland, OR (US)

( * ) Notice: Subject to any disclaimer, the term of this patent is extended or adjusted under 35 U.S.C. 154(b) by 0 days.

(21) Appl. No.: 09/268,815

(22) Filed: Mar. 16, 1999

(51) Int. Cl.$^7$ ............................................. G06F 17/21
(52) U.S. Cl. .................................. 707/501.1; 707/513
(58) Field of Search ............................... 707/501, 513, 707/501.1, 500, 530; 706/59

(56) References Cited

U.S. PATENT DOCUMENTS

| | | | |
|---|---|---|---|
| 5,708,825 A | | 1/1998 | Sotomayor .................. 395/762 |
| 5,835,905 A | * | 11/1998 | Pirolli et al. .................... 707/3 |
| 5,864,863 A | | 1/1999 | Burrows ...................... 707/103 |
| 5,870,559 A | * | 2/1999 | Leshem et al. ......... 395/200.54 |
| 5,968,125 A | * | 10/1999 | Garrick et al. .............. 709/224 |
| 6,021,439 A | * | 2/2000 | Turek et al. ................. 709/224 |
| 6,052,730 A | * | 4/2000 | Felciano et al. ............ 709/225 |
| 6,154,736 A | * | 11/2000 | Chickering et al. ........... 706/59 |
| 6,157,618 A | * | 12/2000 | Boss et al. .................. 370/252 |

OTHER PUBLICATIONS

John et al., Using GOMS for User Interface Design and Evaluation, ACM Trans on Computer–Human Interaction, Dec. 1996, vol. 8, No. 4, 287–319.

Card et al., The Psychology of Human–Computer Interaction, Lawrence Erlbaum Assoc., Inc Publishers, Hillsdale, NJ, 1983, 24–45, 139–147.

\* cited by examiner

*Primary Examiner*—Stephen S. Hong
(74) *Attorney, Agent, or Firm*—Ipsolon LLP

(57) ABSTRACT

A machine implemented method of objectively determining attributes of a Web site is disclosed. A Web site located on a network of computers is spidered to determine all objects and hyperlinks associated with the Web site and an index is constructed to represent the Web site. The Web site is then analyze to discern scenes, similar to page views, and links that connect the scenes. Information is then collected of the relationships of the scenes that reflects human factors, such as wait times and hyperlink location. This relationship information is quantified and associated with the hyperlinks and scenes. A model is then constructed of the scenes and hyperlinks and the quantified relationship information is applied to the model. An objective effectiveness of the Web site is then calculated by mathematical treatment of the model. A preferred model is a graph theory model having vertices and edges.

24 Claims, 3 Drawing Sheets

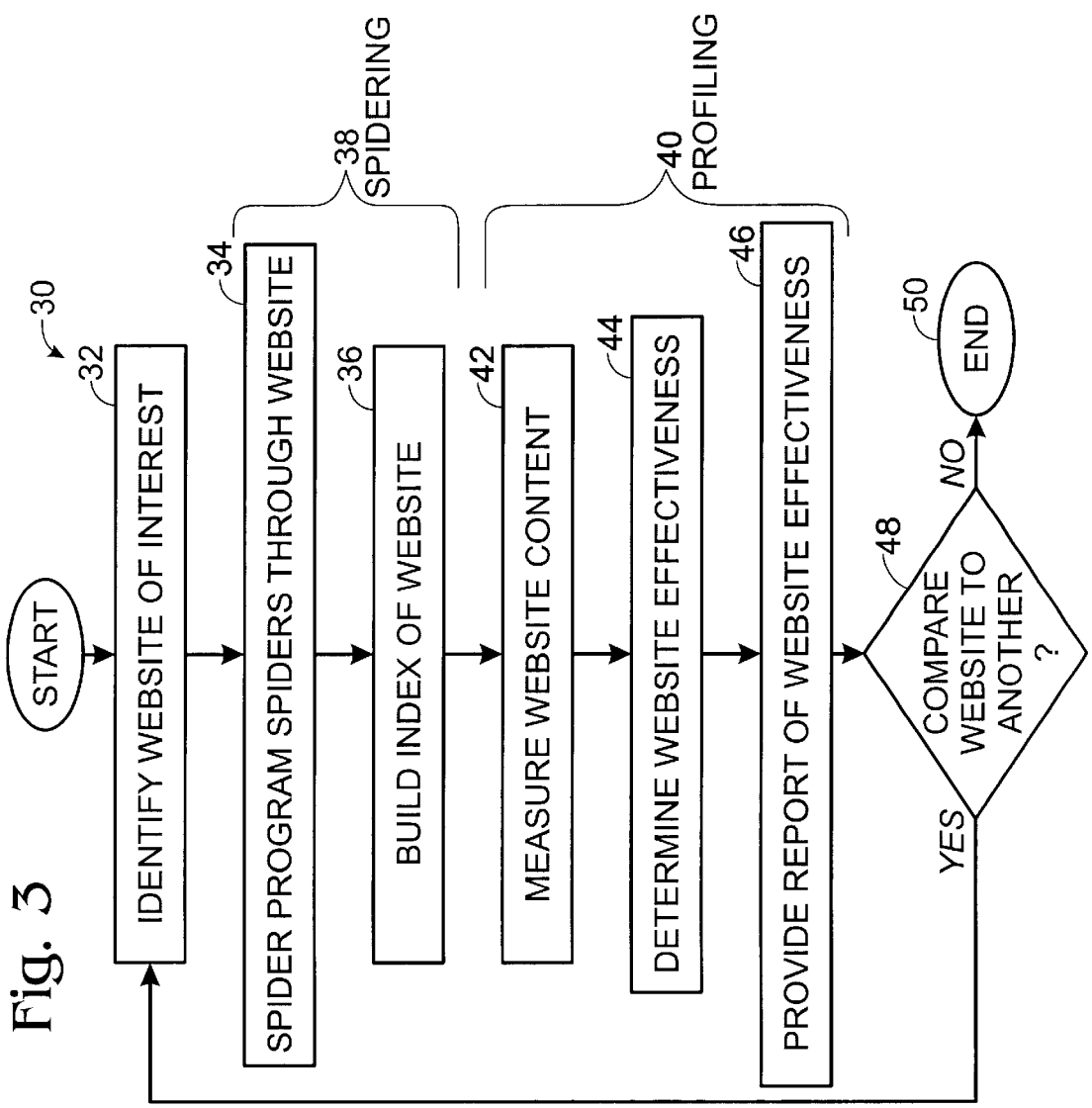

OBJECTIVE MEASUREMENT AND GRAPH THEORY MODELING OF WEB SITES

BACKGROUND OF THE INVENTION

1. Field of the Invention

This invention pertains to internet web sites and particularly pertains to an objective measurement of internet web site effectiveness.

2. Description of the Related Art

The internet, or world wide web (or simply "Web"), is a matrix of networks that connects computers around the world. Within the internet are Web sites that can be accessed by internet users. Users need a web browser and an internet connection to access a Web site.

Definitions and usage of internet terms such as Web sites, pages, frames, and framesets vary within the industry and between texts and authors. In addition, such terms may have different usage depending upon whether the reference is to the visual representation of a Web site or to code that creates the Web site. This specification seeks to use terms in their most common usage, but where a term is used in a particular manner, its meaning is intended by its usage.

A Web site is one or more Web pages. A Web page is a document on the internet and consists of a markup language file (e.g., HyperText Markup Language (HTML) or EXtensible Markup Language (XML)) and associated files (e.g., graphics and scripts). Usually a Web page contains hyperlinks, or simply "links," that connect one Web page to another Web page on the same Web site (a local link) or to another Web site (an external link). A hyperlink may also connect one portion of a Web page to another portion of the same Web page. The hyperlinks allow a user to move between Web pages, or portions of a page, by positioning a display cursor on a hyperlink and clicking an input device such as a mouse.

Hyperlinks may set out the organization of a Web site and serve as a guide or table of contents to the Web site. For example, a Web site may have an outline of the Web site contents and words of the outline may be hyperlinks connecting the Web page having the outline to other Web pages of the Web site.

Many Web sites have a home page as their starting point, or entry page, which frequently functions as a table of contents, or map for the site, or as an introduction to the site. Typically, the home page serves as an entry point to the Web site and contains one or more links to other Web pages within the Web site.

Most Web sites are created and maintained to convey information to the internet user. The information may be advertising, data, news, entertainment, or any other type of information that may be conveyed by graphics, alphanumerics, video, or sound. Commercial Web sites may include opportunities for the user to purchase goods or services, communicate with the Web site sponsor, and check a status of a transaction. Commercial sites that offer services (such as searching) or news may present advertising simultaneously with the service, or news.

In almost all Web sites, the Web site sponsor is concerned with how effectively the Web site performs its intended objectives. As noted, most Web sites are intended to convey information to the user. The user must be able to identify, locate, and access the desired information. Thus, Web site sponsors seek means to determine the effectiveness of the Web site in conveying information to the user.

Subjective means of determining a Web site's effectiveness are available to everyone by visiting a Web site and forming an opinion. In addition, there are Web sites that have lists of other Web sites and rank the other sites on subjective criteria such as amusement value, usefulness, and interest. However, such subjective means do not permit a precise or accurate comparison of one Web site to another, or of a Web site at different times with different content or organization.

The National Institutes of Standards and Technology provides a software tool called a Static Analyzer Tool (SAT) that reads the HTML code of a Web page, compares the Web page to "usability guidelines," and provides a report of potential usability problems. The identified usability guidelines are (1) accessibility, (2) form use, (3) performance, (4) maintainability, (5) navigation, and (6) readability. As an example of the operation of this software tool, the usability guideline for "performance" states that internet users access the internet using various connection speeds and slow access to a Web site can deter a user from returning to, or exploring, a slow site. To determine the Web page performance, the Static Analyzer Tool performs four HTML checks of the Web page.

First, the Static Analyzer Tool checks the total amount of graphics on the page and returns a score based on whether the total graphics exceed 30 kilobytes of size. The Static Analyzer Tool then checks the HTML code to determine the number of images that do not specify height and width. The Static Analyzer Tool then checks the number of images that are in a JPEG image format, which format is considered incompatible with some web browser software. Lastly, the Tool checks whether the Web page has a banner that is greater than 475 pixels in size.

The other usability guidelines are determined by other HTML checks of the Web page and the Static Analyzer Tool returns a report of potential usability problems for further investigation by the Web site designer for a particular Web page.

While providing a means for checking a Web page's HTML code against a set of guidelines that portend usability problems, the Static Analyzer Tool does not attempt to view the Web site as a whole, or view pages as would a human Web site visitor. The Static Analyzer Tool checks the HTML code for a Web page and appears to ignore plug-ins, JavaCode, audio files, frames and other common features that can greatly enhance or diminish a Web site's effectiveness. In addition, by analyzing the HTML code of a Web page only, the Static Analyzer Tool does not provide feedback on content, size, or wait times between Web pages of a Web site, or access to the Web page as would be experienced by a human user.

The Static Analyzer Tool does not provide a ready means to objectively compare Web sites. Thus, Web site designers can not compare their Web site to other Web sites in the same, or similar, industry as a means to determine relative effectiveness.

Accordingly, a need exists for a method to analyze an entire Web site using a model that accounts for human perceptions and traits and which permits a direct objective comparison of two or more Web sites.

SUMMARY OF THE INVENTION

The present invention objectively measures attributes of a Web site. The objective measurements of the present invention permit one Web site's effectiveness to be objectively compared to other Web site's effectiveness. A preferred method of determining a Web site's effectiveness includes modeling a subject Web site and determining one or more numerical quantities from the Web site model that reflect the Web site effectiveness.

The model preferably includes objects that are coupled by relationships. Values, associated with human browsing behaviors, are applied to the objects and relationships to account for human considerations to determine the Web site's effectiveness in providing information to the user.

A preferred model for a Web site is a graph theory model having vertices, (also referred to as nodes) and edges (also referred to as arcs). Graph theory modeling permits use of known algorithms for calculating properties of the modeled Web site. Known algorithms that provide useful information of the Web site properties include shortest path and Kruskal algorithms.

Preliminary to modeling a Web site, a preferred embodiment of the present invention discerns Web site scenes and links that connect the scenes. In display terms, scenes are similar to page views but include all aspects of a user's experience while viewing a Web site such as audio files and other types of information in the same way as browser software renders it for human users. Links are the mechanisms that connect one scene to another; most commonly, links are hyperlinks placed in one scene and that can be activated by computer input devices to launch another scene.

In addition, associated with the Web site are properties of the Web site's content, such as size, composition, and freshness. These content properties are measured on a scene by scene basis, or, in the case of freshness, by the age of elements within scenes.

Information of the scenes and Web site content is used to create the Web site model. Under a graph theory analysis, Web site scenes are modeled as vertices, and links that connect scenes are modeled as edges. Values are assigned to the edges that reflect human factors and a numeric determination of effectiveness is calculated by an algorithmic operation on the model. Different human factors may be applied as values to the model to calculate a numerical representation of Web site effectiveness. Human factor values may be experientially estimated, empirically measured, determined from monitoring human interaction with Web sites, or taken from human factors references.

A useful measure of a Web site's effectiveness is the accessibility of information on the Web site. As stated, nearly all Web sites seek to convey information to a user that is viewing the Web site. Even pure commercial Web sites that exist only to sell products must convey information of the products and prices. Thus, an effective Web site is one that provides relatively easy access to the information. Easy access to information includes ease of finding the information, accessing the information (including time to download and display the information), and mentally processing the information.

In a preferred embodiment, accessibility is determined for each scene of a Web site and an objective determination is calculated for the overall accessibility of the Web site using human factor values. A preferred method for determining accessibility for a scene is the shortest path algorithm as applied to a scene-based model of the subject Web site.

In other preferred embodiments, the present invention further objectively determines and reports Web site content and usability.

Preferred embodiments of the present invention permit analysis of multiple Web sites and side-by-side comparison of the Web sites along objectively determined bases. A preferred organization of the results categorize the content or usability information and provide a chart showing the relative values of the categories. The report may also provide objectively determined numbers of Web site content and usability.

BRIEF DESCRIPTION OF THE DRAWINGS

FIG. 3 is a flow diagram of a preferred embodiment of a method of objectively determining a Web site's attributes of the present invention.

FIG. 6 is a diagrammatic representation of a page structure of the exemplary Web site of FIG. 2.

FIG. 7 is a diagrammatic representation of a preferred embodiment of a scene-based model of the exemplary Web site of FIG. 2 wherein the scenes are represented as vertices and links that connect scenes are represented as edges.

DESCRIPTION OF THE PREFERRED EMBODIMENTS

Preferred embodiments of the present invention are explained with reference to the accompanying figures.

The present invention provides an objective measurement of a Web site. The results of the measurement may be reported and used in comparison with other Web sites and with the same Web site at different times.

Figure 1:
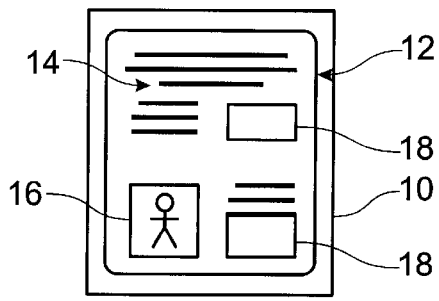
FIG. 1 is a diagrammatic representation of a display having a Web page displayed thereon.

By way of background, and for definitional purposes, a short description of a preferred context of the present invention is provided. An internet user launches a web browser on a personal computer, connects to the internet and directs the browser to a URL (Uniform Resource Locator), a Web site address. The browser then connects the user to a Web page 12 which is viewed on a display 10 (FIG. 1). The Web page, typically a markup language document (e.g., HTML, XML) contains information that is presented to the user as elements such as text 14, graphics 16, audio and video files (not shown), applets (not shown), and other files (strictly speaking, applets are objects, but the term "elements" is used herein to include all such code). In addition, Web pages include links 18 that a user can select and activate to go to another Web page. Also, frames may be used to organize and format information on a page. To the user, viewing a page display, frames are not normally visible.

Figure 2:
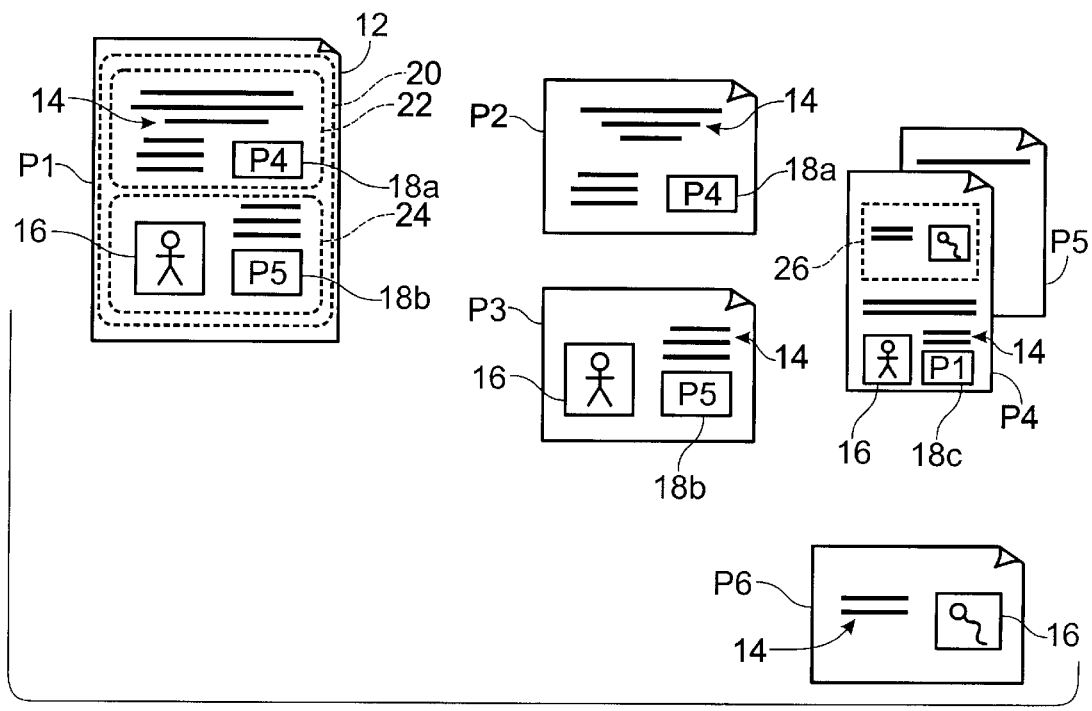
FIG. 2 is a diagrammatic representation of an exemplary Web site having a home page P1 and linked pages P2–P6 and selectively showing frames and elements.

In a representation of a Web site, shown in FIG. 2, the Web page 12 (also referred to as page P1) is a frameset 20 having frames 22 and 24. Frame 22 references a separate page P2 exemplarily having text 14 and a link 18a that points to another page P4. Page P4 is represented with frame 26, and elements graphic 16 and text 14. Page P4 also includes a link 18c pointing to page P1. Frame 26 references a page P6 also exemplarily having information elements text 14 and graphic 16.

Similarly, frame 24 of page P1 references a page P3 that exemplarily includes graphic 16, text 14, and a link 18b that points to page P5. Page P5 exemplarily includes elements (not separately numbered) and is represented as not having a link to another page.

Thus, a Web page may have one or more frames. A frame references a page, which may, in turn, have one or more frames, in addition to other elements.

With reference to FIG. 2, most Web sites have a home page P1 as their starting point, which frequently functions as a site introduction and may include a table of contents or site map that consists of a set of links 18. The home page P1 links to other Web site pages P2–P6 by a frame reference or links 18.

The Web site may include greater or fewer pages than represented in FIG. 2 wherein the number of pages, frames, and links are artificially reduced for ease of illustration, and it is not intended to be a limitation of the present invention. Further, a Web page is represented as being entirely displayed on the display 10 of FIG. 1. In practice, many Web pages contain more information than can be viewed on a display at one time. Thus, it is often necessary for a user to scroll along the page to view the entire page.

Additionally, the exemplary Web site of FIG. 2 shows pages P1 and P4 At having frames and pages P2, P3 and P5 as pages without frames. Alternatively, a Web site may be composed entirely of pages that have no frames, or entirely of pages having frames. Not all versions of web browsers can display frames. To accommodate both types of browsers, some Web sites offer a frames version and a non-frames version of the Web pages.

Furthermore, while the present invention is described in the context of an internet, the present invention may also be practiced in the context of an intranet, or other networks of connected computers such as local area networks and wide area networks.

As stated a Web site is composed of a plurality of pages, frame sets, frames, and elements. The prior art attempts to evaluate Web pages based on measurements of the markup language code and do not adequately account for the user's view of the Web site or measure the entire Web site.

Determining Web Site Atributes

A preferred embodiment of the present invention evaluates the entire Web site using, inter alia, objective criteria of human factors as values associated with a graphical model of the Web site. With reference to FIG. 3, a preferred method 30 of objectively determining a Web site's attributes is diagrammatically presented.

The present invention preferably resides on a computer having access to a network such as the internet and the computer performs such steps as required to achieve the results of the invention. This computer, hereinafter the "client network computer," preferably includes input means, display means, computational means, and means to connect the client network computer to a network of computers. Software resides on the client network computer and the client network computer performs steps in accordance with instructions from the software.

To perform objective measurements of a Web site, it is necessary that the client network computer interact with the Web site. Preferably, the client network computer can access the Web site of interest by connection to a network that is also connected to the Web site. Alternatively, the client network computer may interact with the Web site by steps such as copying the Web site onto storage media, such as a removable hard disc or floppy disc, and conveying the disc into the client network computer. The client network computer may then analyze the copy of the Web site by directly accessing the disc.

The preferred embodiment described below assumes the instance in which the client network computer accesses a network that is connected to the Web site of interest and thereby accesses the Web site. However, alternative means of accessing the Web site (or collection of pages located on a network) are considered as within the scope of the present invention unless excluded by the explicit language of the claims.

With reference to FIG. 3, a Web site of interest is identified 32, preferably by its uniform resource locator (URL). A spider program at the client network computer is launched that locates the identified Web site and spiders the Web site. Next, information from the spider program is used to index, or catalog, the Web site 36. The index includes the Web site elements, links, objects, and other information. This phase of spidering and indexing the Web site is collectively called the spidering phase 38 because spidering is commonly known to include the step of indexing.

The second phase is profiling 40. The profiling phase 40 measures Web site content at 42 and determines Web site effectiveness at 44.

The present method then prepares a report 46 of the Web site effectiveness.

At step 48 the method queries whether to compare the measured Web site to another Web site. Such comparisons are useful to provide the user with a relative gauge of a Web site's effectiveness as against other Web sites in the same, or similar, industry. If the user desires such a comparison, the method then loops back to step 32 to identify a new Web site and then performs the steps of spidering 38 and profiling 40 on the newly identified Web site. In the instance of determining effectiveness of two or more Web sites, the report will provide a comparison of the respective Web sites to permit side-by-side analysis of the results.

If the user does not elect to compare another Web site, the present method terminates at step 50.

Spidering Phase

As stated, the first phase of determining a Web site's effectiveness is to spider 38 the subject Web site. Spidering, and programs for spidering, are known in the art. A spider program is an automated program that searches a Web site for Web documents (pages) and rebuilds their addresses and content-related information, including elements, objects, links, and frames, into the index on the client network computer.

In the case of a very large Web site, the Web site may be sectioned into smaller serving sizes and each serving size analyzed. The serving size may be calculated as a predetermined number of bytes of information, or a predetermined number of pages, or a number of scenes that correspond to a total browsing time. For example, it may be determined for a Web site, that in five hours total browsing time 2000 scenes may be viewed and thus, the serving size would be 2000 scenes.

As part of the spidering phase, local links that point to link pages within the Web site are distinguished from external links that point to other Web sites.

The index replicates the Web site. The Web site of FIG. 2 is replicated in an exemplary representation, FIG. 6, wherein the pages 52 are identified by their P1–P6 designations. The pages of the Web site are connected by links 18 shown and described in FIG. 2 such that page P1 is linked, by a frame structure, to pages P2 and P3. In turn, page P2 is linked to page P4 which is also linked to pages P1 and P6. Page P3 is linked to page P5. The Web page links 18 are represented as directional lines 54 in FIG. 6 that extend between pages. Arrows on the lines indicate a direction of the respective links.

Profiling Phase

The second phase is profiling 40. After a target Web site has been spidered, including indexing, the method of the present invention profiles the index to measure content and determine effectiveness of the Web site.

The index on the client network computer is measured for content at step 42 of FIG. 3.. A preferred embodiment of this step is shown in greater detail in FIG. 4 and described immediately below.

From the index information, the present invention builds scenes of the Web site at 42a. Scenes provide a truer representation of a Web site than page-based views. Using scenes also provides a means to measure a Web site size that corresponds to the size as would be sensed by a user.

A scene is a representation of a portion of a Web site that provides new information to the user. Each page view that provides new information to the user, is a separate scene. In the exemplary Web site of FIG. 2, page P1 displays three pages because P1 contains frames having pages P2 and P3, respectively. However, a user views pages P1, P2, and P3 as a single scene because the pages appear on the display simultaneously.

In its broadest sense, a scene is a discrete user experience at a Web site that begins at a first event and ends at a second event. The events may be user initiated, Web site initiated or timed events. An example of a user event is entering a Web site address into a browser address bar or selecting a link to connect to another page. A Web site may initiate an event by changing a frame or graphic after a user has moved a cursor over an area of the page view. Timed events may occur when an audio file completes, or when a graphic has been displayed for a predetermined time. Other events and means of initiating events are within the definition of scenes.

Accordingly, with reference to FIG. 7, the Web site of FIG. 2 is represented as three scenes. Scene S1 comprises page P1 having frames of pages P2 and P3. Viewing page P4 provides new information and is thus a separate scene S2. Page P5 also presents new information to the user and is another scene S3. However, page P6 is a frame of page P4 and is thus part of scene S2. The pages correlate to the scenes thusly:

S1: P1, P2, P3
S2: P4, P6
S3: P5.

Preferably a null scene S0 is added in front of the initial scene, or home page scene, S1 to facilitate particular measurements as described below.

The scenes are modeled to reflect a structure and organization of the subject Web site. Thus, scenes are modeled as vertices of a graph theory model and hyperlinks that connect the scenes are modeled as edges. In general terms, the model will have scenes S0, S1, S2 . . . Sm, where m is the total number vertices connected by edges E1, E2 . . . En, where n is the total number of edges.

After the program of the present invention builds the scene representation of the Web site 42a, the present invention determines the number of scenes and measures the size of each scene at 42b to determine the Web site size that is indicative of a size as would be perceived by a human user.

Scenes are the portions of a Web site that a user perceives at one time interval. Page size can vary significantly and a single scene may contain several pages or a single page may contain several scenes. Thus, a page count, or tabulation of page sizes, is not as meaningful to represent the actual size of a Web site as are the scenes. Scenes better reflect the Web site size as an internet user would experience the Web site's size.

The present invention reports the number of unique scenes that a user can be exposed to, and the number of URLs or objects that are used to compose those scenes.

Composition

Next, the composition of the modeled Web site is measured at step 42c. A measurement of a Web site's composition is an indication of the amount of attention a user must devote to comprehending the information at the Web site. To measure composition, the present invention counts a number of characters, measures a number and size of graphic files, and estimates a time required for execution of audio and video content of each scene during a user experience of a scene. The present invention then determines a relative percent of the characters, graphic files, and audio and video content based on the amount of time required to comprehend the information at a basic level.

Thus, preferably, the number of characters are multiplied by an average reading speed to calculate an amount of time required to comprehend the character information (text) in the Web site. Likewise, the time to comprehend the graphics, audio, video, applets, and other elements is calculated or measured. The relative times of each element type is later reported to provide data on the composition of the Web site. Thus, a Web site that, in total, requires X minutes to comprehend, may be composed of 75% text, 15% graphics, and 10% applets.

Next, a freshness of the Web site is measured at step 42d. The present invention measures an age of all elements and objects that comprise the scenes. Elements and objects are then grouped within age categories. In a preferred embodiment, age categories may include: less than one week, greater than one week and less that one month, greater than one month and less than three months, and greater than three months. The number of elements and objects having an age in each age group may be presented graphically. Thus, it may be determined that 60% of all elements are less than one week old, 35% of all elements are more than one week and less than one month old, and 5% of all elements are more than three months old.

Preferably, an overall freshness percentage is calculated by adding the percentages for the youngest three age categories. Other methods of calculating overall freshness may also provide desirable information for Web sites of a particular type.

The Web site is analyzed for browser bias at 42e. Different web browsers have different features and capabilities. As stated, some browser versions can not display frames. Likewise, some browsers can not accept, or work with, plug-ins (a software component that plugs into the browser and permits the browser to access and execute files embedded in HTML documents).

Thus, the Web site is analyzed for features that are not common to all browsers. The greater the number of non-common features in a Web site, the greater the degree of browser bias. Alternatively, the degree of browser bias may be determined by the relative obscurity of a Web site feature so that certain features are weighted more than other features in accordance with relative compatibility with a greater number of browsers or browser versions.

Figure 4:
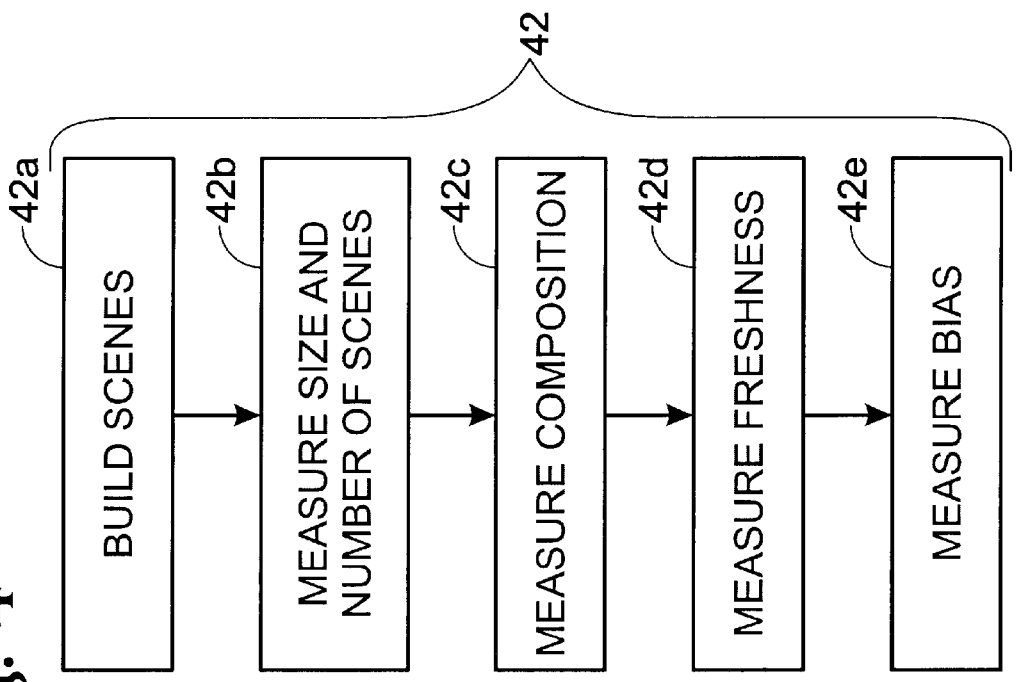
FIG. 4 is a flow diagram of a preferred embodiment of a method for measuring Web site content.

The determination and measurement of content of the subject Web site is presented in a particular order in FIG. 4. However the order of measuring content is not a feature of the present invention and other orders for making such measurements are deemed within the scope of the present invention. However, some measurements require that the scenes be known at the time the content is measured.

Effectiveness

Figure 5:
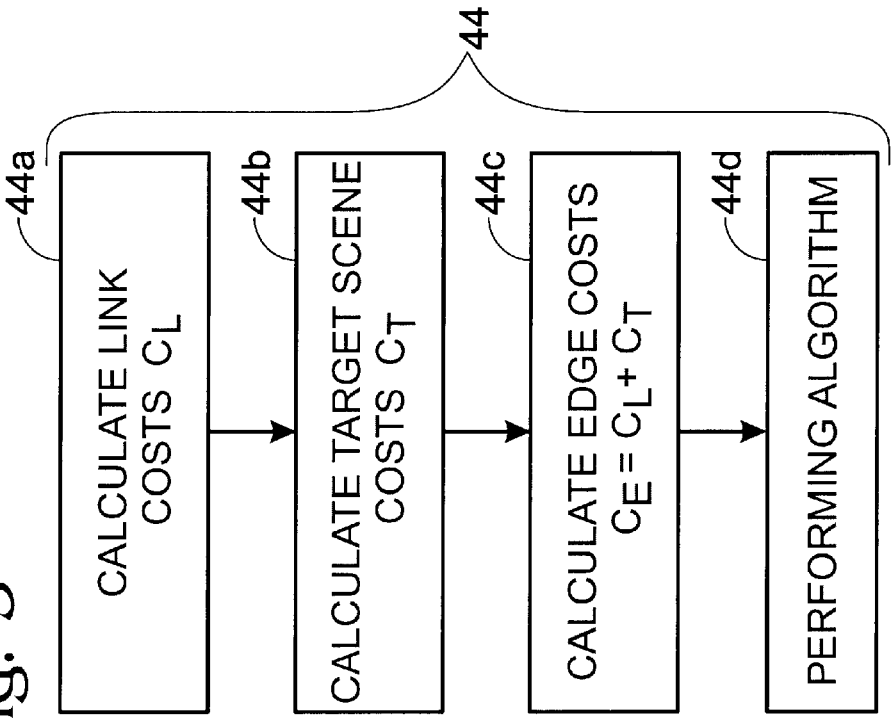
FIG. 5 is a flow diagram of a preferred embodiment of a method for determining Web site effectiveness.

Turning now to the determination of effectiveness 44, shown expanded in FIG. 5, the above-described measurements of the content of the modeled Web site provide data that is useful to a determination of the effectiveness of the Web site. In a preferred embodiment, Web site effectiveness is related to accessibility of information on the Web site. Accessibility is a measured as a link cost, $C_L$, and a wait time cost, $C_T$.

As is well known, a user visiting a Web site will read or interpret a Web site page and will typically click on a link to visit another Web page, either locally within the Web site or externally to another Web site. When accessing a local Web page, the user will experience several factors including locating the link, interpreting the link to determine likely information connected with the link, and waiting for the new Web page to load.

The accessibility of information is thus affected by links as well as text, layout, and organization of information within a page. The human user must interact with the Web site to find desired information and factors of link location, presentation, and organization can make it easier or harder for the user to comprehend and use. The present invention accounts for such factors in determining accessibility.

If a link is located near the bottom of a scene, or on a different scene such as a bottom portion of a page, below the displayed portion of the page, the link is likely to be more difficult to locate and use. Similarly, if the new page/scene accessed by the link requires many seconds to load on the user's display, the information is less accessible than pages that load quickly.

Preferably, accessibility is determined for each scene of the modeled Web site as the cost of traveling along the shortest path from a first scene to a target scene. The result has units of time (seconds).

Figure 8:
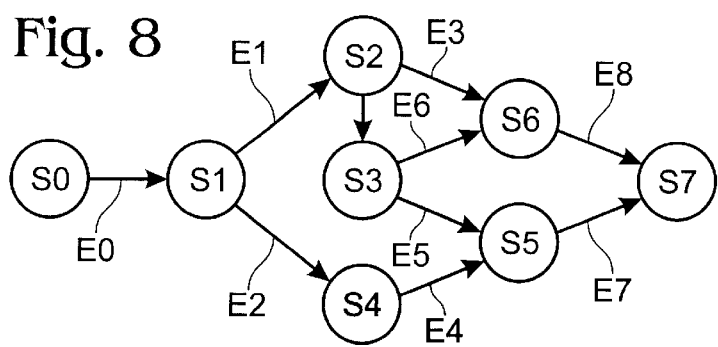
FIG. 8 is a diagrammatic representation of a scene-based model of the present invention.

Thus, if a Web site comprises seven scenes, as depicted in FIG. 8, accessibility is determined for each scene as a cost, in seconds, to traverse from the null scene, S0, to the target scene S[1,2,3,4,5,6,7].

Recall that the scenes are modeled as vertices of the graph model and the links are modeled as edges. The accessibility is associated with the edges, as a cost to traverse from one vertex to a linked vertex and is designated as an edge Cost $C_E$.

Thus, this cost function, or edge cost, $C_E$ is equal to the cost to arrive a new target scene $C_T$ (the wait time) plus the link cost $C_L$. Thus, $C_E = C_T + C_L$.

Cost to Arrive

The cost to arrive, of wait time, for a target scene, $C_T$, is the time to download and render (i.e., display the scene on a computer monitor) the elements of a new target scene at a predetermined connection speed.

Preferably, the present method uses a simplified caching browser model, such that elements of the target scene that do not change when linking from a previous scene to the target scene are not included in the cost. The current algorithm for analyzing the potential human browsing paths follows all paths concurrently; it is not possible to know what is or is not in cache for a hypothetical user. This is not significant because objects that are common from one scene to the next are not included in the cost.

Thus, the wait time cost, $C_T$, is the sum of load times of an element from the Web site server and the transfer rate for the elements. Only elements that are unique to the target scene are used in calculating $C_T$.

Link Cost

The link cost $C_L$ is determined by the time required for a user to scan, process, and interpret all elements in the scene that are located prior to, or "above," the link, scan the link itself, choose the link, and then click on it. Scanning the elements within the scene employs a human user behavior model by taking into account the time to process each element. Different elements require different amounts of time to view, process, and interpret. The time to scan, process, and interpret text elements may be determined as a reading speed for a *number of words]. Similarly, graphics . . . Other elements, such as audio and video elements, offer straightforward measurements because the time to "scan," process, and interpret such elements is determined strictly by the time necessary for the element to play.

Preferably, the order of scanning elements within a scene is approximated as the order of appearance of the elements in the HTML source code rather than the reading order as would be viewed on a display. This approximation eliminates a need to use an HTML rendering engine-to layout the scene. However, in alternative embodiments of the present invention, an order of scanning elements may be determined by their respective locations in a display.

In the determination of scanning time, recurring scene structure (elements that appear constant from one scene to the next) are not counted in the time to scan and acquire new links.

In the preferred embodiment, the method employs "non-errored" behavior, that is, the model-human-browser does not retrace old steps.

The following equations illustrate the cost of transitioning from an initial scene, $S_i$, to a target scene, $S_t$.

The Model

As noted, the present invention builds a scene-based model of the subject Web site. A preferred model is a graph theory model, which is represented in FIG. 8 for a hypothetical Web site. Vertices S0, S1, S2, . . . S7 are connected by edges E1, E2 . . . E8 that extend from one vertex to another. Each vertex represents a scene of the subject Web site and each edge represents a hyperlink that connects scenes.

In the preferred embodiment of graph theory, the program preferably performs a shortest path algorithm (also known as a Dijsktra algorithm) to calculate the relative cost, or human factor load, to move about the Web site from one scene to another.

Preferably, the algorithm will determine the shortest path from the null scene S0 to all other scenes that comprise the Web site. The process starts at the null scene so that the cost to load the first scene S1 is included in the determination. The dynamic programming techniques for performing the shortest path algorithm are well known in the art of graph theory as has been applied to network problems.

In this manner, the accessibility time for each scene may be calculated. The accessibility times are then categorized into a predetermined number of categories such as easy (less than X seconds), moderate (greater than X seconds and less than Y seconds) and hard (greater than Y seconds). Other categories having other time intervals may be selected. An overall accessibility percentage may be determined by adding a predetermined number of categories, such as the top two, or three, most accessible categories. Alternatively, a total cost of each path from scene S1 to all other scenes may be added together for a total accessibility cost associated with the Web site.

In addition, an average transition time may be calculated as an average of all wait times for the subject Web site.

The present invention provides a report of the content and effectiveness of the subject Web site at 46. In a preferred embodiment, the report may present content and usability factors for the Web site as a percentage of overall Web site values. Thus, Web sites may be determined to have a range of accessibility times and the report will divide that range into a predetermined number of categories. Thereafter, the report will calculate the number of scenes, or percentage of scenes, that fall within the categories and provide a bar chart of the results.

In cases where two or more Web sites have been analyzed, the report preferably provides the results for each Web site in a side-by-side manner to permit easy comparison of the Web sites. Such comparison are particularly useful to compare related Web sites, such as Web sites of a particular industry or competitors Web sites.

Parts of the foregoing description is presented in terms of operations performed by a computer system, using terms such as Web, Web site, frames, documents, links, applets, methods, data, values, characters, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system. The term computer system includes general purpose as well as special purpose data processing machines, systems, and the like, that are standalone, adjunct or embedded.

Various operations are described as multiple discrete steps in a manner that is most helpful in understanding the present invention, however, the order of description should not be construed as to imply that these operations are necessarily order dependent.

This specification sets forth the best mode for carrying out the invention as known at the time of filing the patent application and provides sufficient information to enable a person skilled in the art to make and use the invention. The specification further describes materials, shapes, configurations and arrangements of parts for making and using the invention. However, it is intended that the scope of the invention shall be limited by the language of the claims and the law of the land as pertains to valid U.S. patents.

What is claimed is:

1. A machine implemented method of objectively measuring a Web site, comprising the steps:
    discerning scenes and links of a Web site located on first computer that is coupled to a network of computers;
    modeling the Web site as a Web site model having a plurality of the scenes and links, the model being a graph theory model having a plurality of vertices and edges corresponding to the scenes and links, respectively; and
    determining a numerical representation of a Web site attribute by performing an algorithm on the Web site model.

2. The method of claim 1 further comprising the step of determining a value associated with the links and assigning the value to a corresponding one of the plurality of edges as a value associated with the edge and using the value in the algorithm to determine the numerical representation of the Web site attribute.

3. The method of claim 1 further comprising the step of determining a plurality of link values associated with the links and assigning the link values to corresponding ones of the plurality of edges as an edge value associated with the edge and using the edge value in the algorithm to determine the numerical representation of the Web site attribute wherein the link value is indicative of a location of the link within a scene.

4. The method of claim 1 further comprising the step of determining a plurality of link values associated with the links and assigning the link values to corresponding ones of the plurality of edges as a edge value associated with the edge and using the edge value in the algorithm to determine the numerical representation of the Web site attribute wherein the link value is indicative of a time to load a scene associated with the link.

5. The method of claim 1 wherein the algorithm is a shortest path algorithm.

6. The method of claim 1 wherein the step of discerning scenes and links of the Web site comprises spidering the Web site and building an index of the Web site on a second computer, wherein each scene is a discrete portion of the Web site for presenting information to a user in simultaneity.

7. The method of claim 1 further comprising the step of analytically measuring Web site content.

8. The method of claim 7 wherein the step of analytically measuring Web site content includes determining a number of the Web site scenes, wherein each scene is a discrete portion of the Web site for presenting information to a user in simultaneity.

9. The method of claim 7 wherein the step of analytically measuring Web site content includes determining a freshness of the Web site by determining an age associated with elements of the scenes and indicating a time during which the elements have been included in the Web site.

10. The method of claim 7 wherein the step of analytically measuring Web site content includes determining a composition of the Web site, including determining relative percentages of specific content types and corresponding amounts of time for comprehending the content types.

11. The method of claim 7 wherein the step of analytically measuring Web site content includes determining a browser bias of the Web site.

12. The method of claim 1, further comprising discerning Web site scenes and links of a second Web site, modeling the second Web site as a model of a plurality of the scenes and links of the second Web site, and determining a numerical representation of an attribute of the second Web site by performing the algorithm on the second Web site model and providing a report of the attribute of the second Web site with a report of the attribute of said Web site for comparison of the second Web site and said Web site.

13. A machine implemented method of objectively determining an effectiveness coefficient of a Web site, comprising the steps:
    spidering a Web site located on a network of computers;
    building an index of the Web site;
    modeling the Web site using data of the index to form a Web site model, the model including a graph theory model having vertices that correspond to portions of the Web site and edges that correspond to relationships between the portions of the Web site; and
    (d) determining the coefficient by mathematical analysis of the model.

14. The method of claim 13 wherein the portion of the Web site modeled as graph theory vertices are Web site comprising a Web site user experience that occurs during a time interval.

15. The method of claim 13 wherein the relationships modeled as edges are links that connect portions of the Web site.

16. The method of claim 13 wherein the step of building the index includes discerning a plurality of scenes associated with the Web site wherein each scene is a discrete portion of the Web site for presenting information to a user in simultaneity.

17. The method of claim 13 wherein the mathematical analysis comprises calculating a cost to move from a first portion of the model to a second portion of the model.

18. The method of claim 13 wherein the model comprises vertices that represent portions of the Web site and edges that represent hyperlinks connecting portions of the Web site.

19. The method of claim 13 wherein the mathematical analysis is a shortest path algorithm associated with graph analysis.

20. A machine implemented method of quantifying an attribute of a Web site having a plurality of Web pages and a plurality of links wherein each link connects one of the plurality of the Web pages to some other one of the plurality of the Web pages or to some other portion of the Web page, comprising the steps:

determining a human factor associated with a human user accessing pages and links of a Web site located on a network of computers and quantifying the human factor;

representing the pages and links of the Web site in association with a graph theory model; and algorithmically applying the quantified human factor to the graph theory model of the pages and links of the Web site to calculate an attribute coefficient indicative of the human user accessing the pages and links of the Web site.

21. The method of claim 20 further comprising the step of discerning a plurality of Web site scenes and the plurality of links connect one of the plurality of scenes to another of the plurality of scenes.

22. The method of claim 21 wherein the scenes are one or more pages of markup language having a size defined by user experiences of interacting with the Web site from a first time to a second time.

23. The method of claim 20 further comprising the step of discerning a plurality of page views of the Web site and the plurality of links connect one of the plurality of page views to another one of the plurality of page views.

24. The method of claim 20 further comprising the step of modeling the Web site as a plurality of objects and a plurality of connectors and the algorithm is applied to the Web site model.

* * * * *